(12) United States Patent
Mercat et al.

(10) Patent No.: US 8,678,205 B2
(45) Date of Patent: Mar. 25, 2014

(54) CYCLE STORAGE AND LOCKING SYSTEM

(75) Inventors: Jean-Pierre Mercat, Chavanod (FR); Laurent Mercat, Saint Gely du Fesc (FR); Denis Mercat, Sainte Foy lès Lyon (FR)

(73) Assignee: Smoove, Montpellier Cedex (FR)

( * ) Notice: Subject to any disclaimer, the term of this patent is extended or adjusted under 35 U.S.C. 154(b) by 227 days.

(21) Appl. No.: 13/130,689

(22) PCT Filed: Nov. 19, 2009

(86) PCT No.: PCT/FR2009/052216
§ 371 (c)(1),
(2), (4) Date: May 23, 2011

(87) PCT Pub. No.: WO2010/058127
PCT Pub. Date: May 27, 2010

(65) Prior Publication Data
US 2011/0226708 A1   Sep. 22, 2011

(30) Foreign Application Priority Data

Nov. 24, 2008  (FR) ...................................... 08 57966
Jun. 23, 2009  (FR) ...................................... 09 54259

(51) Int. Cl.
*E05B 73/00*   (2006.01)

(52) U.S. Cl.
USPC ................................................ 211/5; 70/233

(58) Field of Classification Search
USPC ................. 211/5; 70/62, 233, 234, 235, 38 A
See application file for complete search history.

(56) References Cited

U.S. PATENT DOCUMENTS

| | | | | |
|---|---|---|---|---|
| 565,057 | A | * | 8/1896 | Westphal .......................... 211/5 |
| 4,055,060 | A | * | 10/1977 | Bellino ........................... 70/234 |
| 4,830,167 | A | * | 5/1989 | Lassche ............................ 211/5 |
| 5,278,538 | A | | 1/1994 | Ainsworth et al. |
| 5,841,351 | A | | 11/1998 | Rey et al. |
| 5,917,407 | A | * | 6/1999 | Squire et al. ..................... 211/5 |
| 7,471,191 | B2 | * | 12/2008 | Le Gars ........................... 70/233 |
| 7,726,160 | B2 | * | 6/2010 | Gagosz et al. .................... 211/5 |
| 8,127,577 | B2 | * | 3/2012 | Buhl et al. ..................... 70/38 A |
| 8,272,491 | B2 | * | 9/2012 | Khairallah et al. ................ 211/5 |
| 2008/0034820 | A1 | | 2/2008 | Gagosz et al. |
| 2009/0201127 | A1 | * | 8/2009 | Stobbe et al. ................... 70/233 |
| 2009/0240575 | A1 | * | 9/2009 | Bettez et al. ................... 705/39 |
| 2009/0266673 | A1 | * | 10/2009 | Dallaire et al. ................ 70/262 |
| 2010/0163503 | A1 | * | 7/2010 | Kelly ............................. 70/233 |

(Continued)

FOREIGN PATENT DOCUMENTS

| | | |
|---|---|---|
| DE | 296 01 144 | 3/1996 |
| DE | 297 15 428 | 11/1997 |

(Continued)

*Primary Examiner* — Jose V Chen
(74) *Attorney, Agent, or Firm* — Greenblum & Bernstein, P.L.C.

(57) ABSTRACT

Cycle storage and locking system for locking plural cycles in at least one storage station. The system includes plural locking and storage points each structured and arranged to lock one of the cycles at the at least one storage station. Each of the plural locking and storage points comprises two arms and a space arranged therebetween sized and configured to receive therein a front wheel of one of the cycles. A locking arrangement is structured and arranged to lock one of the cycles to one of the plural locking and storage points. The locking arrangement includes two laterally movable lateral locking projections arranged on the one of the cycles and two locking recesses arranged on the one of the plural locking and storage points.

20 Claims, 18 Drawing Sheets

(56) References Cited

U.S. PATENT DOCUMENTS

| | | |
|---|---|---|
| 2011/0037240 A1* | 2/2011 | Kritzer et al. .................. 70/235 |
| 2012/0234777 A1* | 9/2012 | Chen ................................ 211/5 |

FOREIGN PATENT DOCUMENTS

| | | |
|---|---|---|
| EP | 0 875 867 | 11/1998 |
| EP | 1 698 749 | 9/2006 |
| EP | 2 090 501 | 8/2009 |
| FR | 2 719 015 | 10/1995 |
| FR | 2 824 942 | 11/2002 |
| FR | 2 897 588 | 8/2007 |
| FR | 2 897 589 | 8/2007 |
| JP | 50-119158 | 9/1975 |
| WO | 2005/001781 | 1/2005 |

* cited by examiner

FIG 17
FIG 18
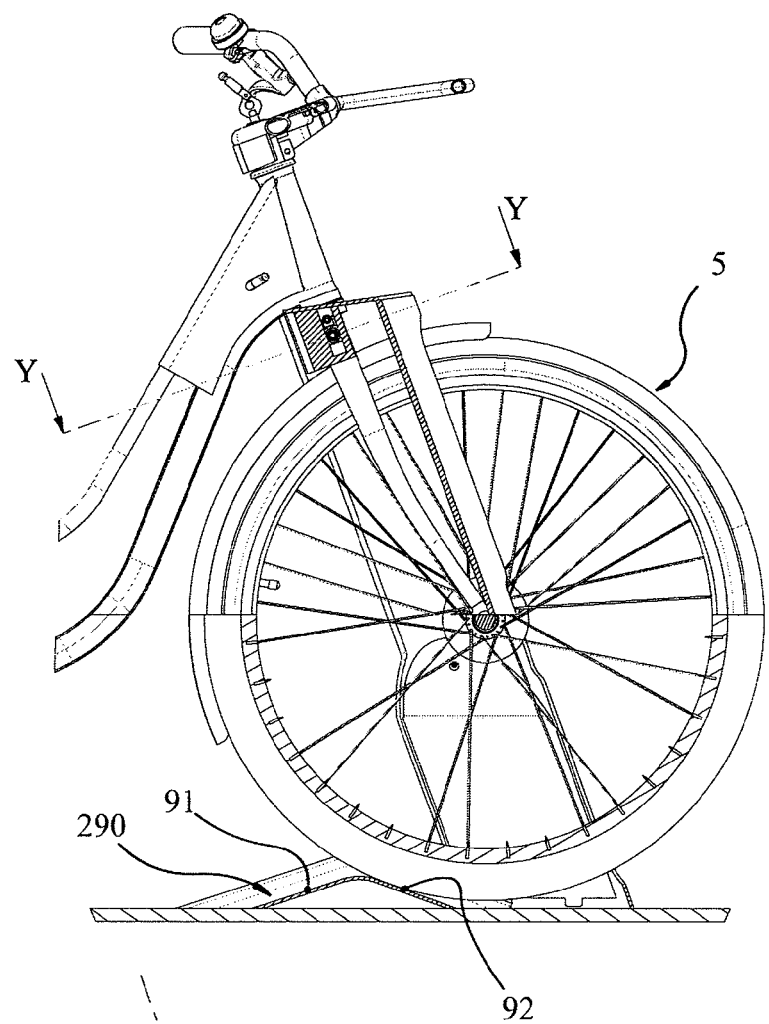
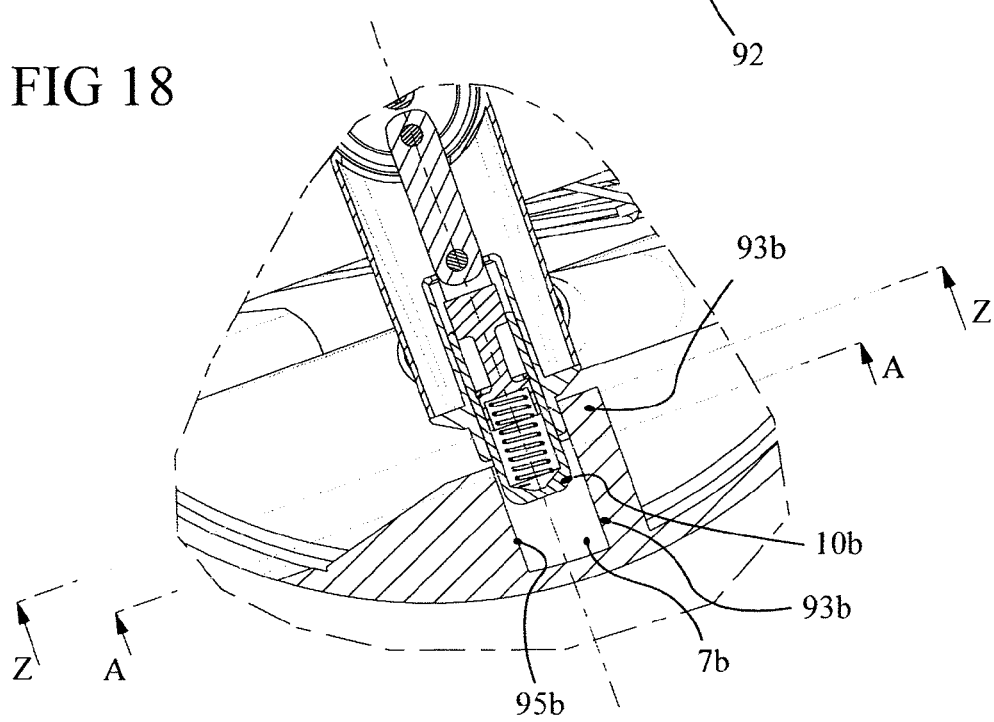

CYCLE STORAGE AND LOCKING SYSTEM

The present invention relates to a cycle storage and locking system, and more particularly a system adapted to store and lock cycles to be made available to authorized public, subject to a specific procedure.

The invention therefore relates to the system comprised of a set of storage points, and a set of cycles adapted to be stored on any of the storage points or locked out of a storage point. The invention also relates to the management means, as well as the antitheft device enabling the user to lock the borrowed cycle out of the storage station.

The invention also relates to electrically power-assisted cycles by providing a very simple and automatic system for recharging the battery, when the cycle is on its storage point.

It has become difficult and expensive to move around town due to traffic congestion and parking difficulties; thus, the cycle provides a convenient and inexpensive means for the public to move around.

The user may own a bicycle; but bicycle sharing is an attractive solution loved by the public, as they do not have to purchase a bicycle and can thus avoid problems of individual storage. In certain cases, the public may be interested in renting a bicycle from specialized rental companies; but this involves certain constraints. In this context, the cycles, shared by users, are made available in certain cities. The existing systems are comprised of a set of storage stations, including locking bollards, which are managed by a management terminal located nearby and allowing the user to unlock a bicycle and to put it back in position on either one of the storage points.

Systems for managing a fleet of bicycles are already known, for example, from the French Patent Applications FR 2 824 942, FR 2 897 589, FR 2 897 588, European Patent Application EP 0 875 867, and International Patent Application published as WO/2005/001781. However, these systems are not entirely satisfactory.

For the user, the existing systems are not entirely satisfactory because the number of storage bollards is often insufficient and the storage stations saturated, thus forcing the user to go to a nearby station to attempt to return the bicycle there.

For the operator, the current systems are very expensive; moreover, installing the storage and locking bollards is not simple and requires major civil engineering, because each bollard contains an expensive mechatronic system to be connected to the management terminal. Thus, due to the cost and complexity involved, the operator cannot increase the number of bollards to prevent saturation of the stations.

Moreover, security outside of the storage station is not completely reliable, as it is managed by an independent and poorly integrated mechanism.

The invention provides an all new, highly reliable and economical system, the implementation of which is greatly simplified. Indeed, it is due in particular to in-station storage means, which are technology-independent and do not require expensive civil engineering, that the installation of this system is simplified.

Electrically power-assisted cycles are very popular in urban use because they provide a very large number of people, not particularly athletic, with easy access to the practice of cycling, particularly in cities with uneven landscape, making the use of bicycles much less arduous. There is a strong potential demand for this type of electrically power-assisted cycles in rental use; however, due to their cost and their greater appeal, their deployment requires a very high level of security against theft and vandalism, on the one hand, and an automatic system for managing the charge of the electric battery, on the other hand, so that the user does not have to monitor the charge when returning the bicycle, and so that the next user is assured to rent a bike that is adequately charged The invention therefore proposes a system for automatically charging the battery of electrically power-assisted cycles, without any user intervention.

Other characteristics and advantages of the invention will become apparent from the description that follows, with reference to the annexed drawings which are provided by way of non-limiting examples, and in which:

FIGS. 7a, 7b are views illustrating the cycle unlocked on a locking point.

FIGS. 7c, 7d are views illustrating the cycle locked on a storage point.

FIG. 13 shows the cycle with its antitheft lock in the inactive position.

FIG. 14 illustrates the cycle with its antitheft lock in the active locking position outside of the station.

FIGS. 15, 15a, 15b, 15c are horizontal cross-sectional views in the area of the locking of the antitheft lock, showing the various locking steps outside of the storage station.

FIG. 15 is a view showing the centered position of the steering, a position which does not allow the positioning of the antitheft lock pin.

FIG. 15a is a view showing the cycle in a position allowing the positioning of the antitheft lock pin.

FIG. 15b is a view showing the cycle in a position of engagement of the antitheft lock pin, and the bias to open the latch.

FIG. 15c is a view showing the locked position.

FIGS. 16a and 16b are perspective views of the mechanism outside of the fork, FIG. 16a showing the position of the antitheft lock pin, prior to being locked, whereas FIG. 16b shows the mechanism with the antitheft lock pin being locked.

FIG. 16 is a schematic illustration of the electronic management.

FIG. 17 shows an offset cross-sectional view showing a second embodiment of the storage point, proposing a system for positioning the bicycle in its post, ensured by the reaction of the front wheel on a ramp that is inclined relative to the ground.

FIG. 18 is a partial cross-sectional view, along the line YY of FIG. 17, showing the mechanism of the fork in the locked position, with the movable projections of the fork in their locking recess.

Figure 1:
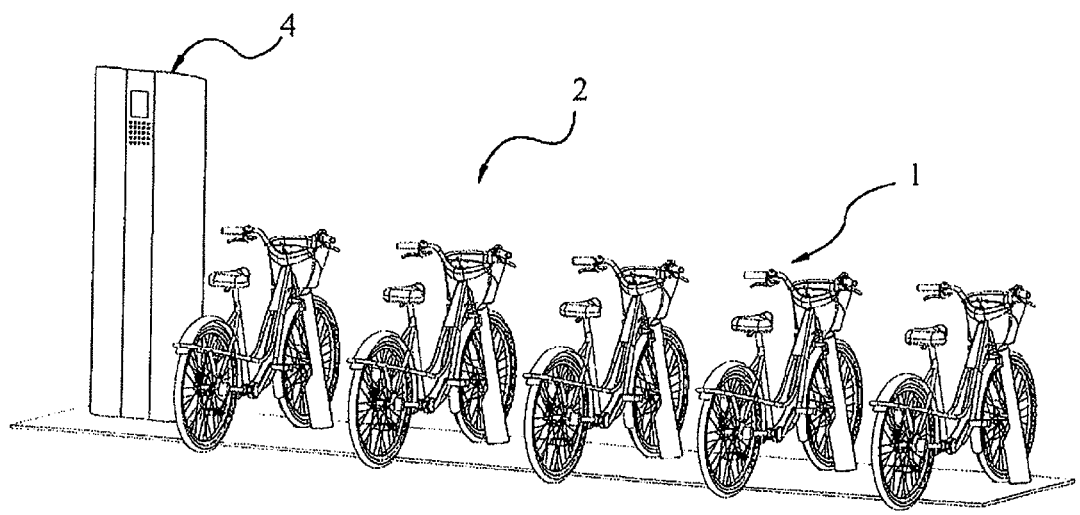
FIG. 1 is a perspective view showing the system according to the invention, with its bicycles positioned and locked on corresponding storage points, as well as the management and key distribution terminal.
Figure 2:
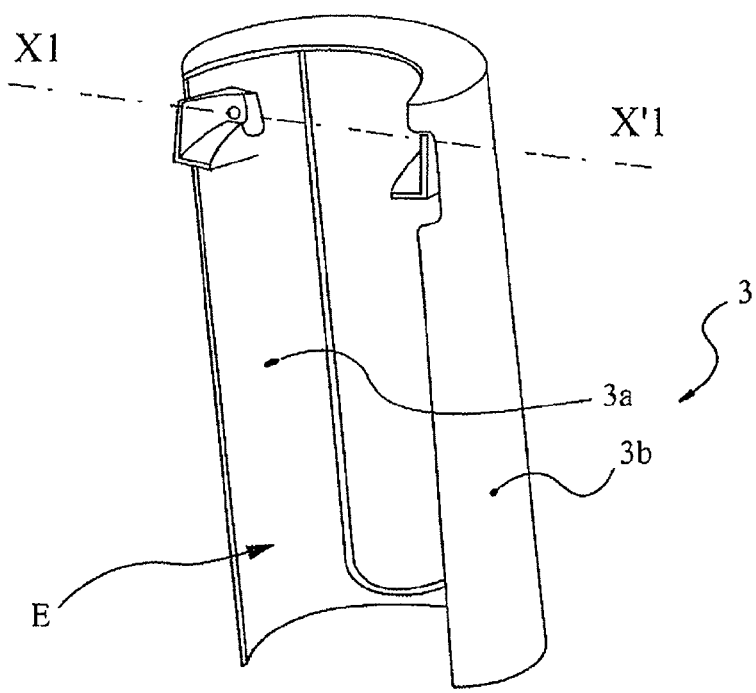
FIG. 2 is a perspective view showing a storage point, seen from the side of engagement of the front wheel of the cycle.
Figure 3:
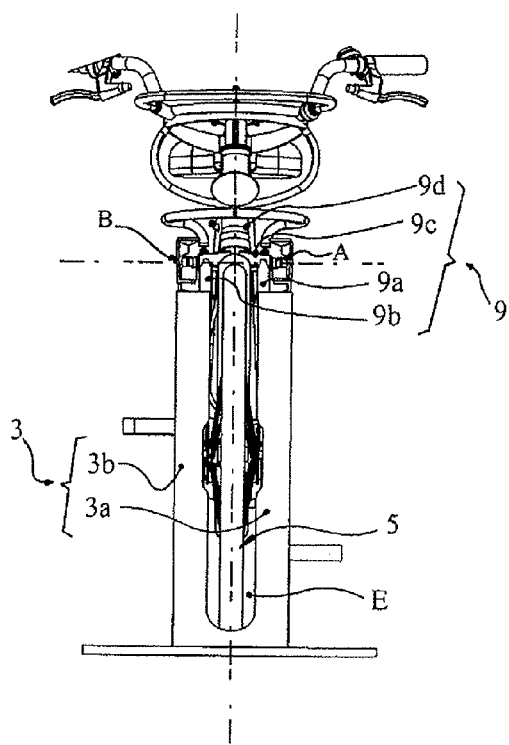
FIG. 3 is a front view of a cycle locked on a storage point.
Figure 4:
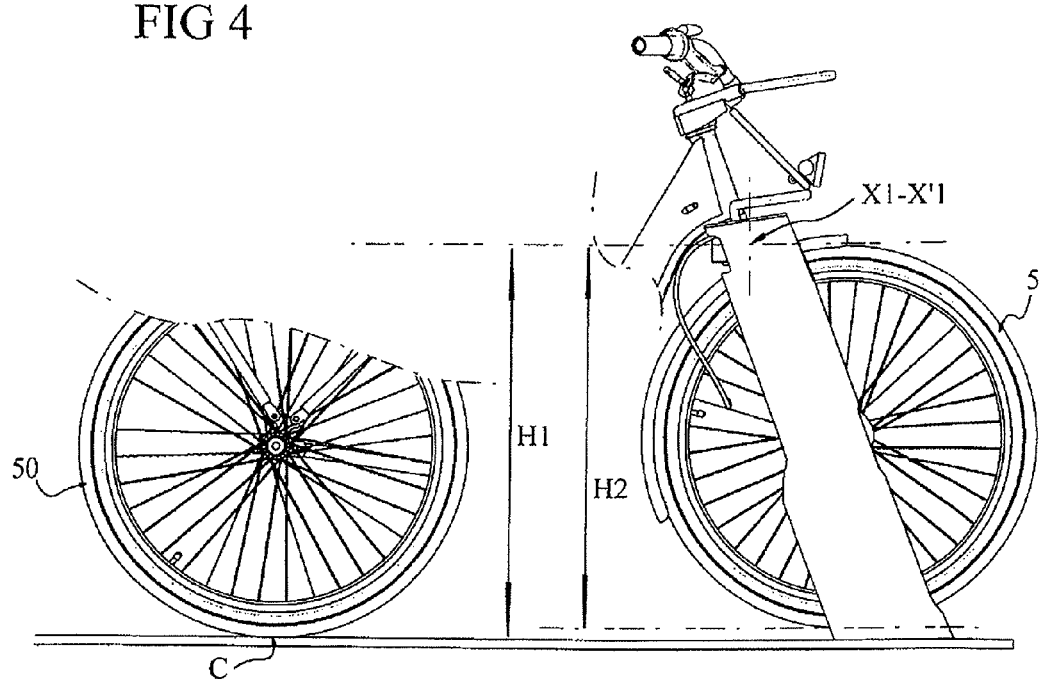
FIG. 4 is a side view of the cycle locked on a storage point.
Figure 5:
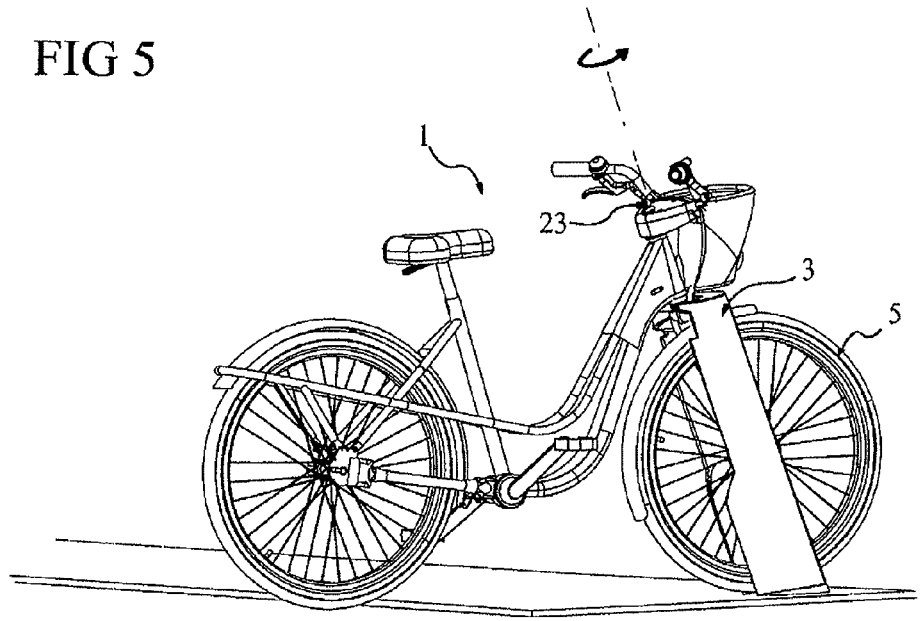
FIGS. 5 and 5a are perspective views showing the retrieval of the cycle from the storage point.
Figure 5A:
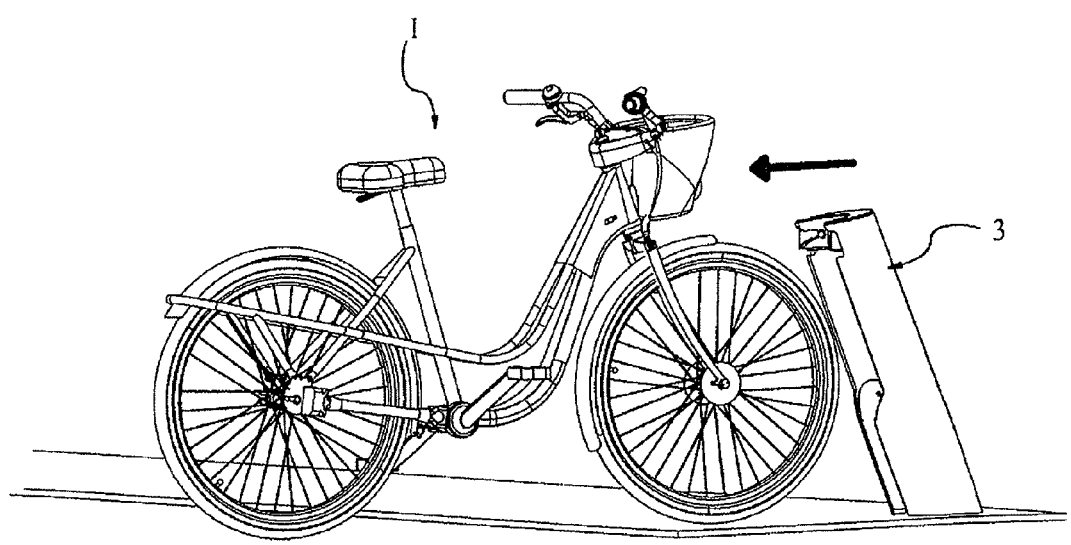
Figure 6:
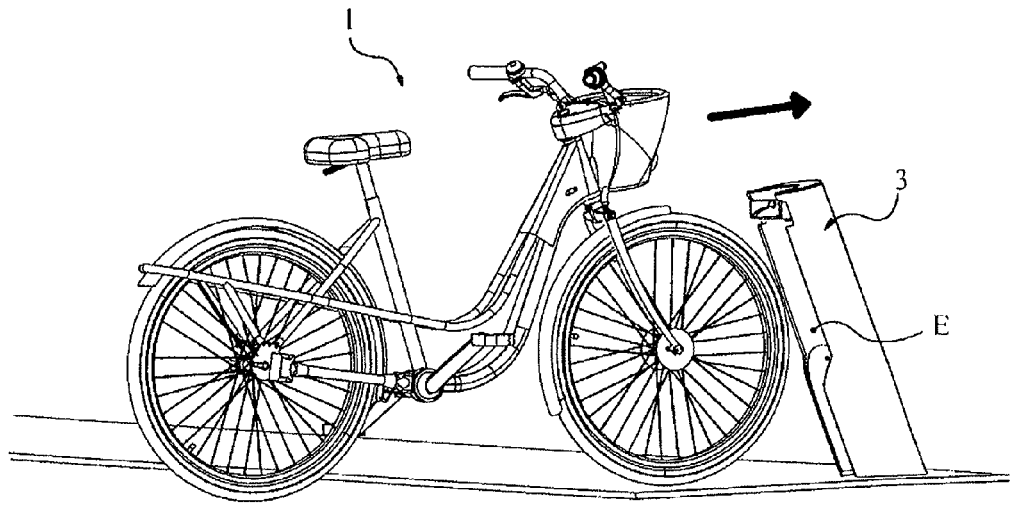
FIGS. 6 and 6a are perspective views showing the positioning of the cycle on a storage point.
Figure 6A:
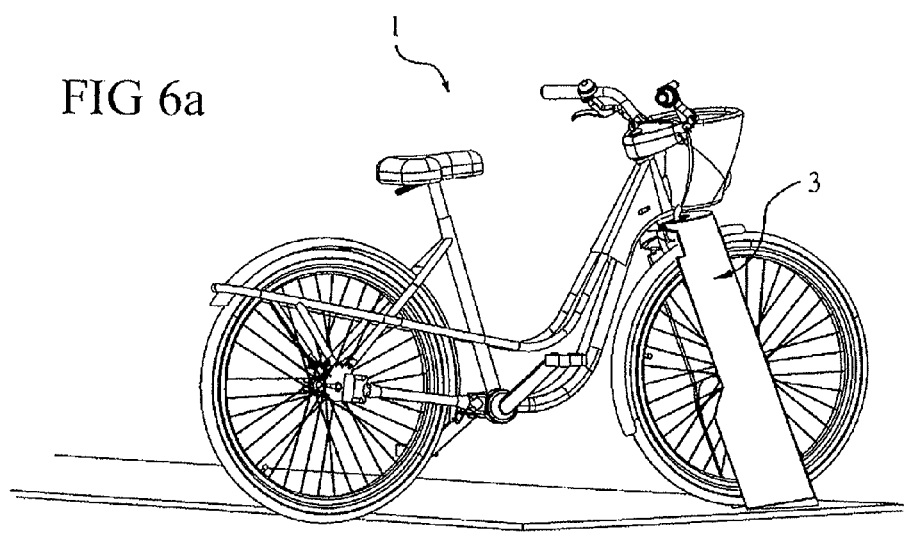
Figure 7A:
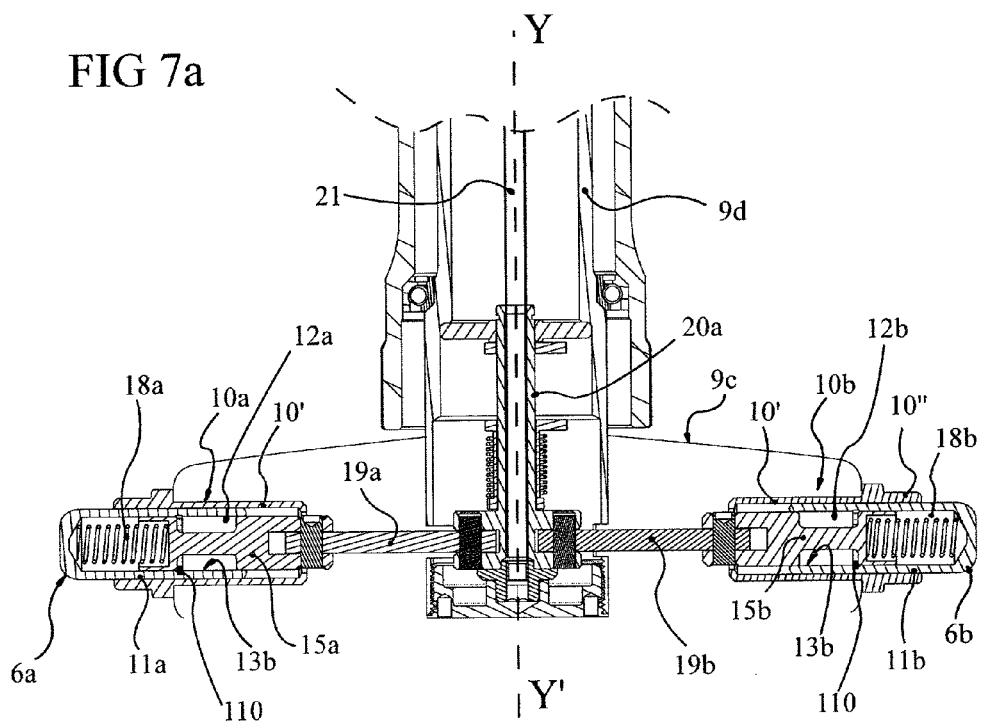
FIGS. 7a, 7b, 7c are views illustrating the front fork of the cycle of the invention, with its locking system in the active locking position.
Figure 7B:
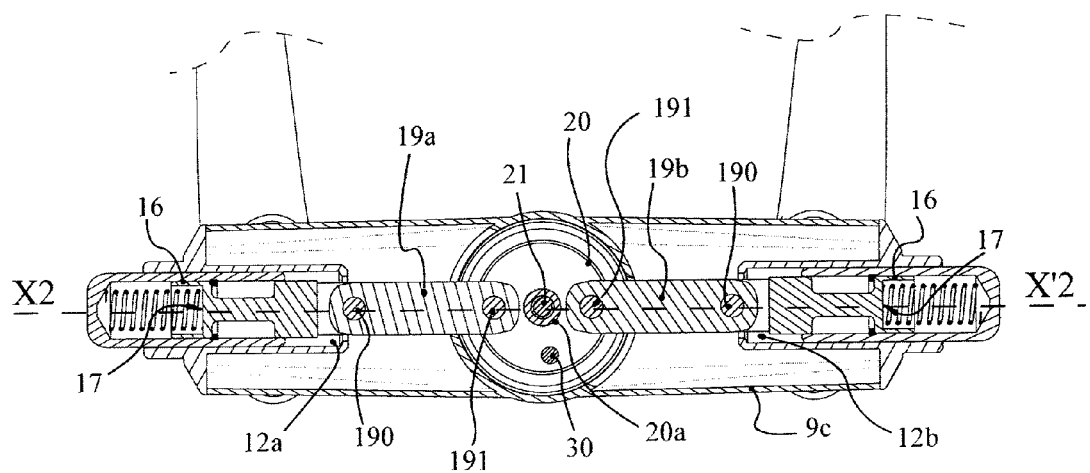
Figure 7C:
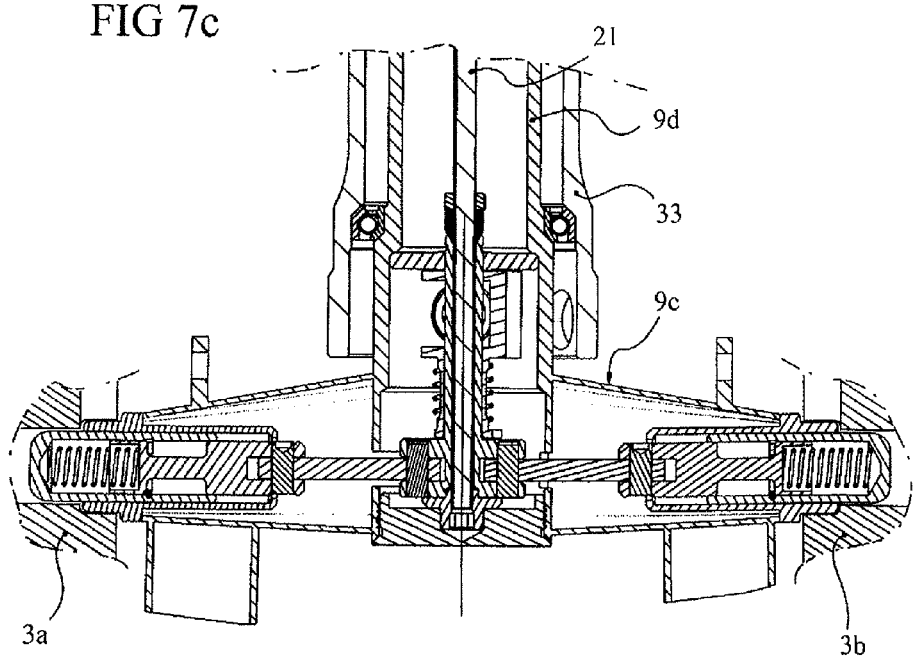
Figure 7D:
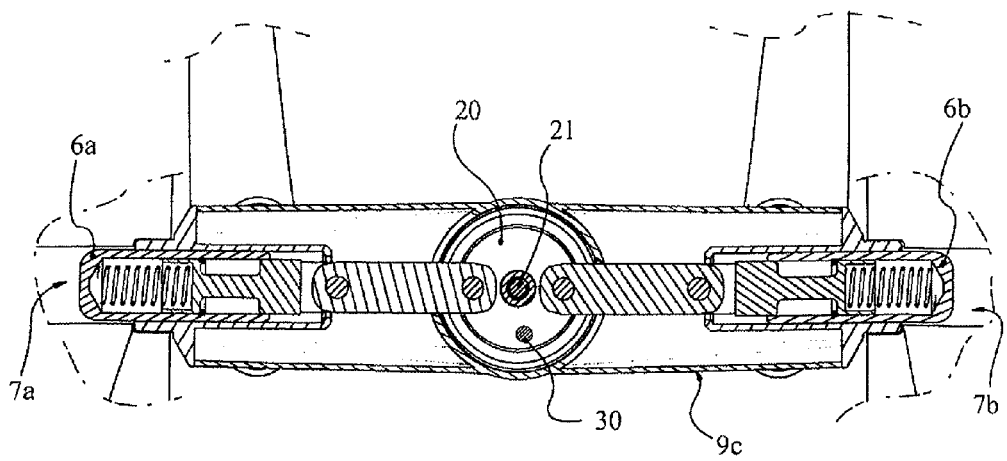

The storage and locking system of the invention includes a plurality of cycles (1) and at least one storage station (2) including a plurality of storage and locking points (3), whereas the system includes means for locking each of the cycles on one of the storage and locking points. Furthermore, the system includes a management terminal (4) arranged in the vicinity of the storage points (3).

Each of the storage points (3) is advantageously comprised of two arms (3a, 3b) fixed to the ground and extending upward, advantageously parallel to form a space (E) therebetween, in which the front wheel (5) of the cycle (1) is adapted to be inserted when positioning the cycle. It is understood that, alternatively, one could have a storage point including two arms that are fixed, not to the ground, but to a support such as a wall, for example.

The means for locking each of the cycles are comprised of two movable projections (6a, 6b) cooperating with two locking recesses (7a, 7b).

According to a characteristic of the invention, the cycle (1) includes the two movable locking projections and the storage point (3) includes the two locking recesses (7a, 7b). It is noted that the cycle (1), as any cycle, is comprised of a frame with a rear wheel, and a steering with a front wheel. Therefore, it is the cycle itself which includes the locking mechanism with the two projections, and not an element separate from the cycle as defined previously, such as a case attached to the cycle.

Thus, each of the upper portions of the inner wall of each arm (3a, 3b) of each of the storage points (3) includes a locking recess (7a, 7b). Thus, each of the locking points includes two recesses having a shape complementary to the projections to be inserted therein. These recesses therefore have a substantially horizontal transverse axis (X1, X1') and open out in the space (E) defined hereinabove, but do not open out laterally outward.

The cycle (2) adapted to cooperate with the storage points conventionally has a generally vertical plane (P) and comprises a front steering (90) with a front fork (9) comprised of two fork blades (9a, 9b) connected by a fork crown (9c), which carries a fork stem (9d).

The fork crown is comprised of a transverse block which, according to the preferred embodiment of the invention, houses the system for locking the cycle on the storage point according to the invention. Of course, one could provide for the systems of the two lateral projections to be located, not in the fork crown, but in each of the fork blades (9a, 9b), for example, in order to project laterally and to cooperate with the corresponding locking recesses of the storage point. This solution would make it possible to have a storage point that is smaller in height than when the projections are in the fork crown.

Figure 8:
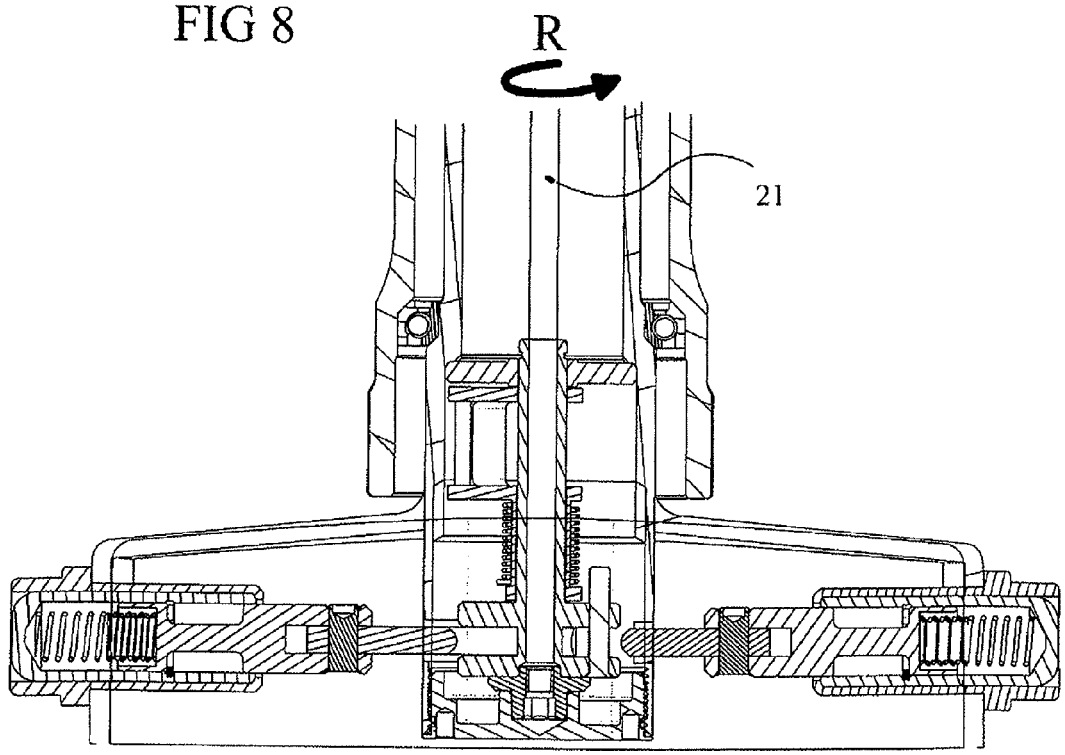
FIGS. 8, 8a are views illustrating the front fork of the cycle of the invention, with its locking system in the inactive unlocking position.
Figure 8A:
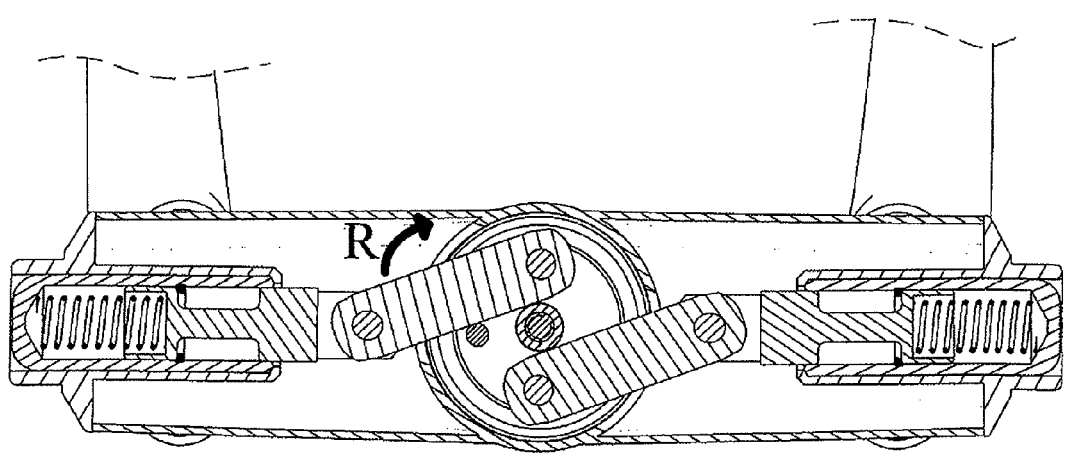
Figure 9:
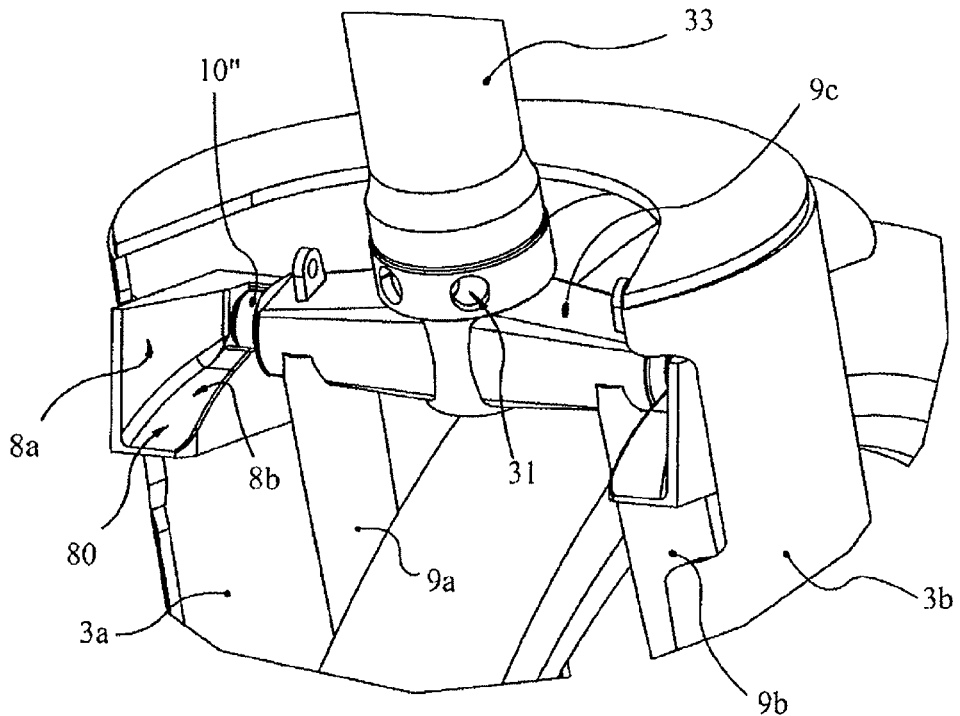
FIG. 9 is a perspective detailed view showing how the cycle is locked on a locking point.
Figure 10:
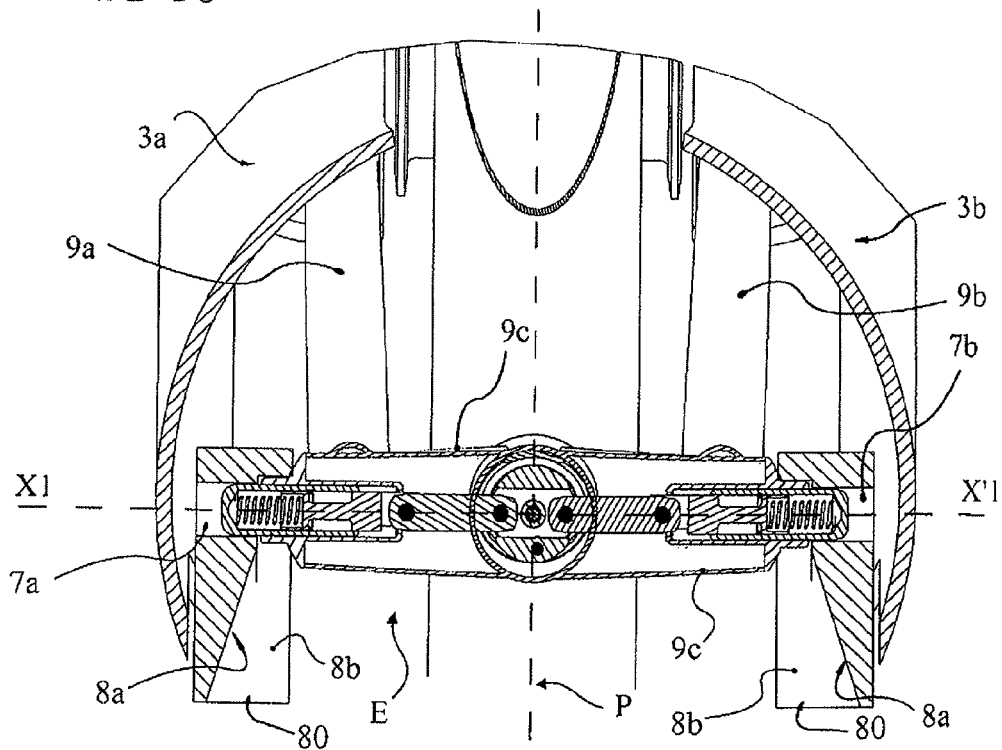
FIG. 10 is a horizontal cross-sectional view in the area of the locking recesses of the locking point, more particularly showing the lateral guiding ramps.
Figure 11:
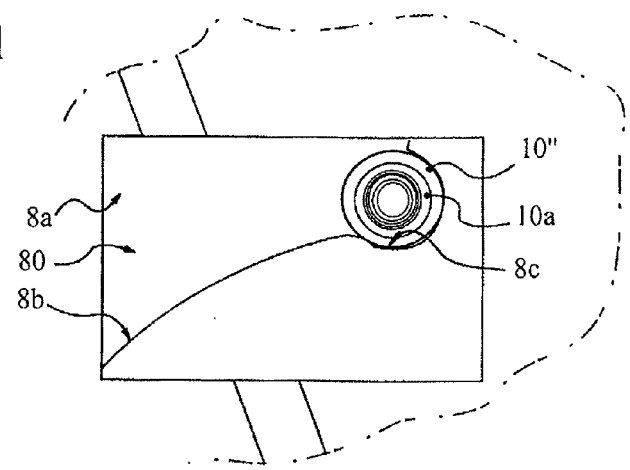
FIG. 11 is a partial side view, more particularly showing the ramp system, which vertically guides the outer tubular portions of the sockets.
Figure 12:
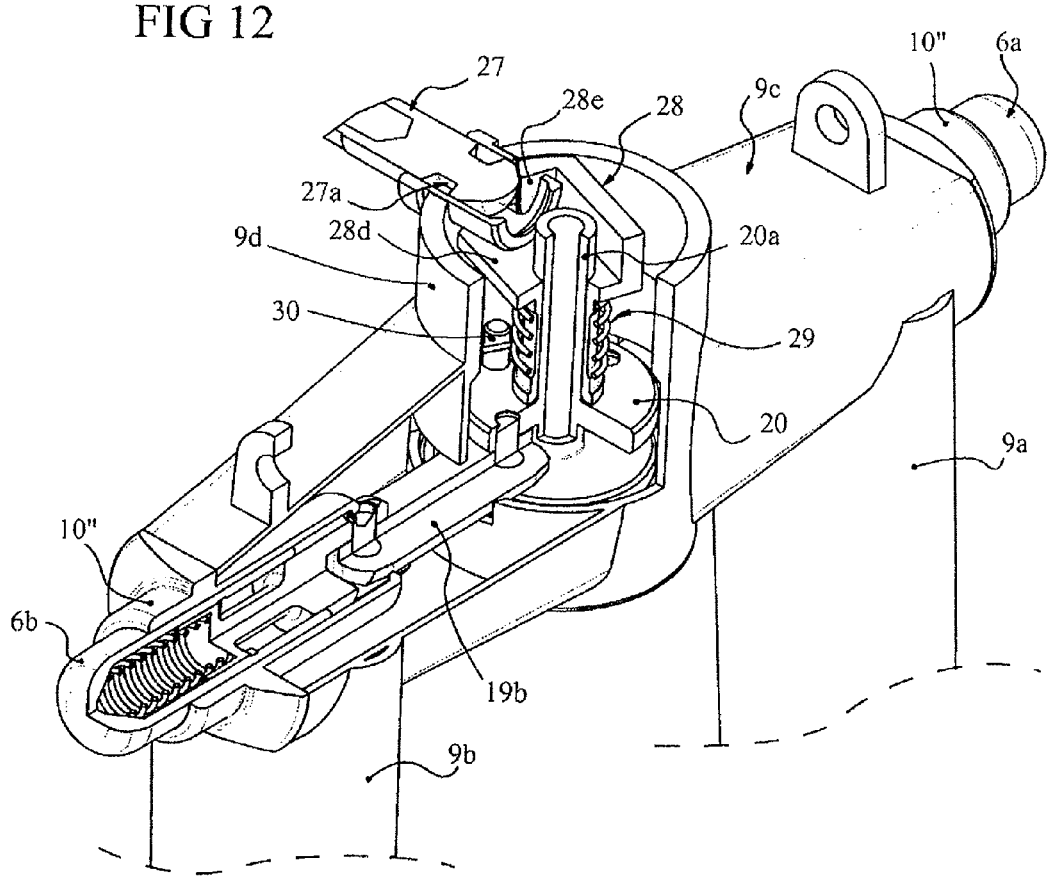
FIG. 12 is a perspective view of the fork crown of the invention, with partial tear out.
Figure 13:
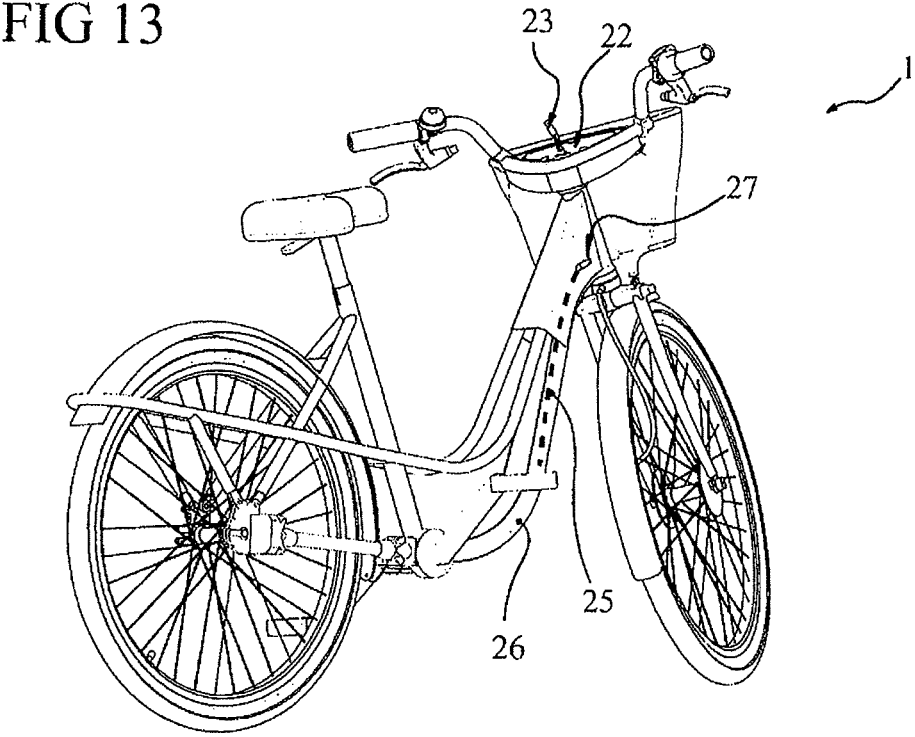
FIGS. 13 to 16b are illustrations of the antitheft system that makes it possible to secure the cycle outside of the storage station.
Figure 14:
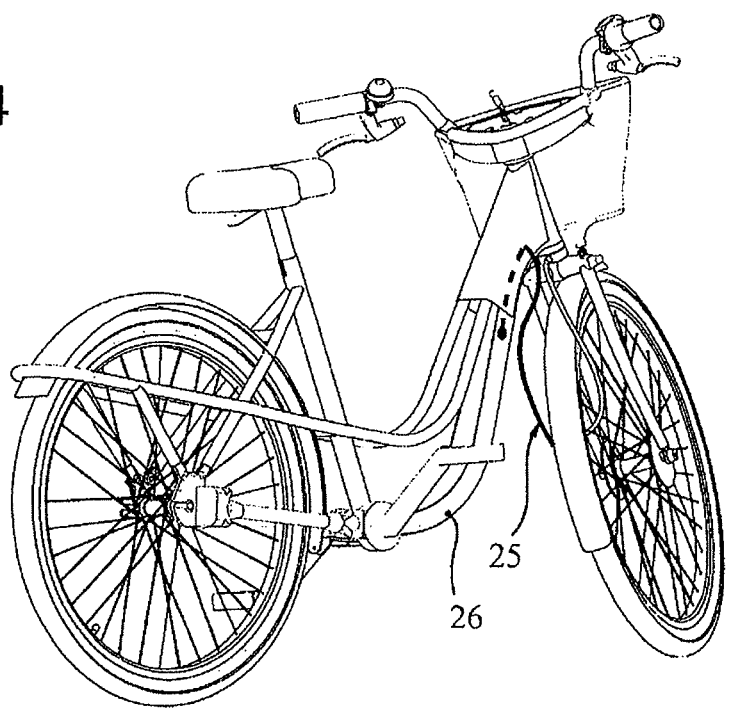
Figure 15:
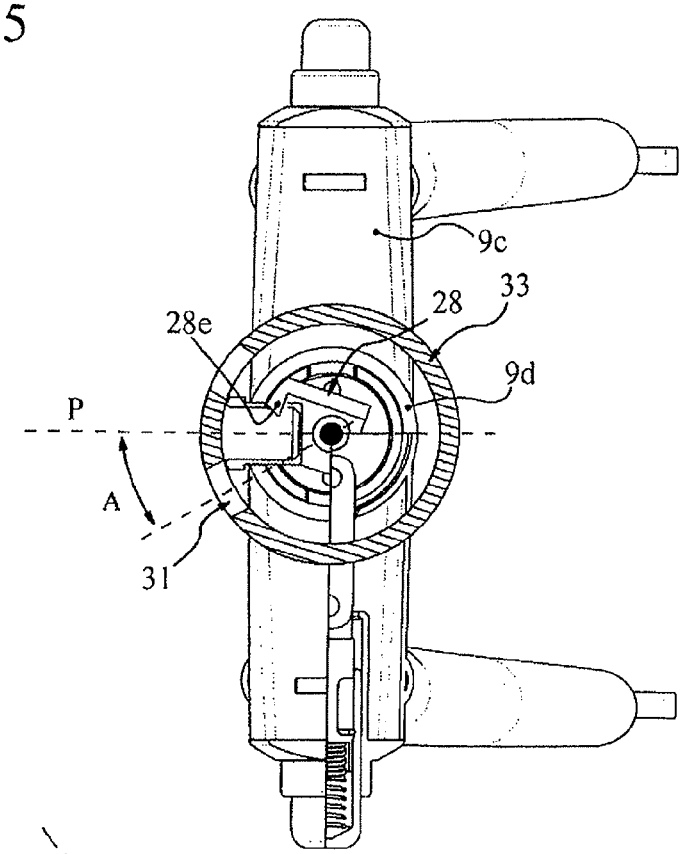
Figure 15A:
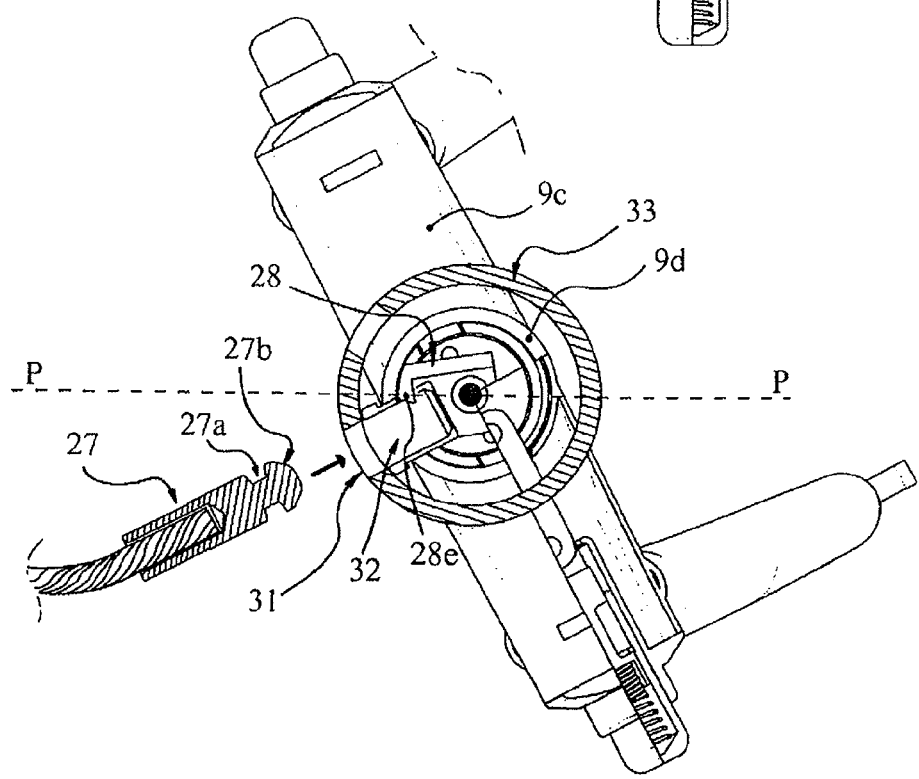
Figure 15B:
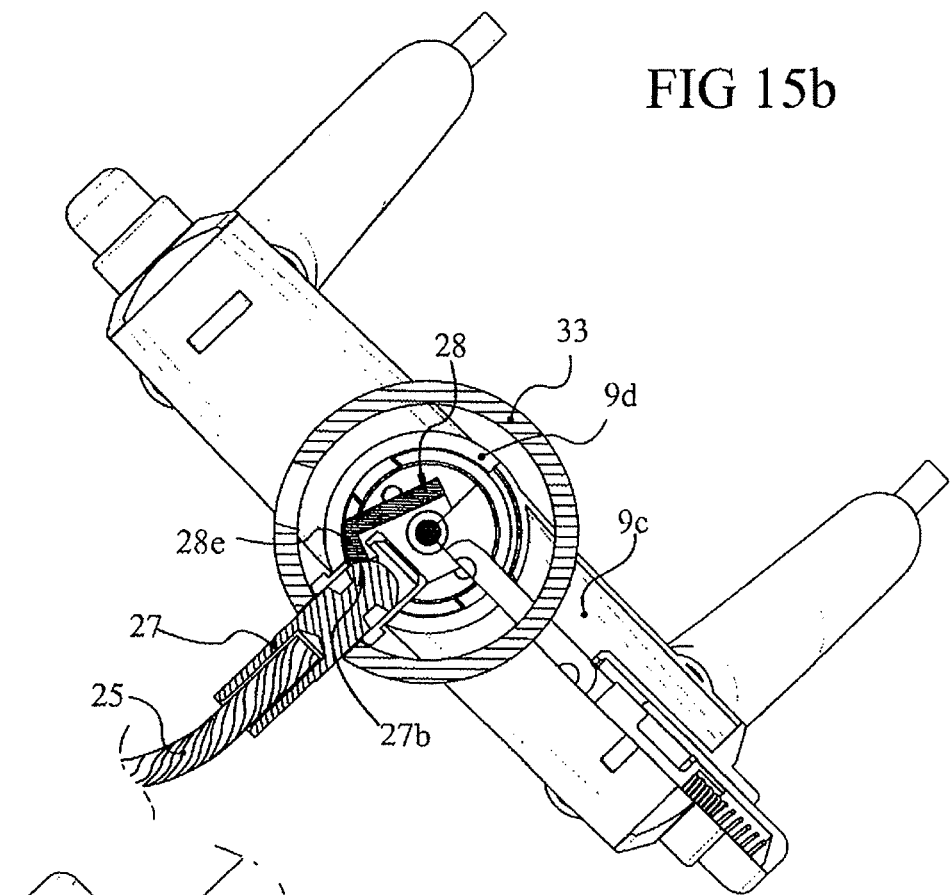
Figure 15C:
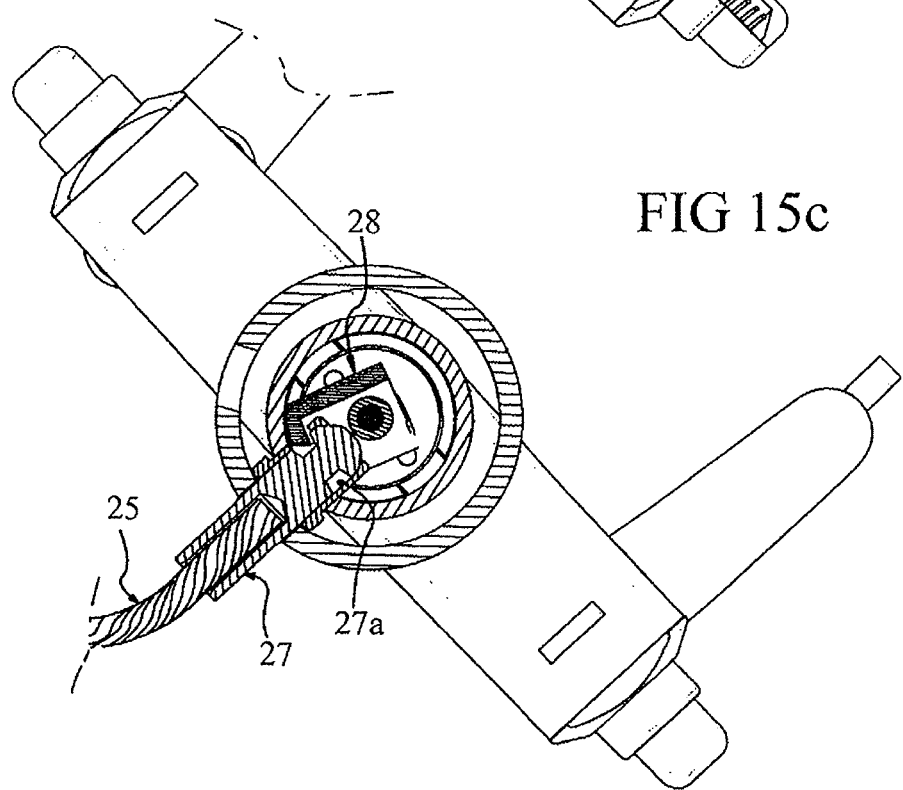

According to the invention, the two movable locking projections (6a, 6b) are transversely mobile relative to the plane (P) so as to move laterally from a retracted inactive position (FIGS. 8 and 9) to a projecting active locking position (FIGS. 3, 4, 5, 6a, 7a, 7b, 7c, 7d, 9, 10, 12, 16a, 18, 20), and vice versa.

In the active locking position, that in which the cycle is stored and locked on its storage point, each of the projections (6a, 6b) is engaged in the corresponding locking recess (7a, 7b) of the storage point (3), as shown in FIGS. 3, 4, 5, 6a, 7c, 7d, 9, 10, 12, 16a, 18 and 20.

Advantageously, and according to a characteristic of the invention, the locking system comprised of the locking projections (6a, 6b) is housed in the front fork crown (9c), each of the locking projections projecting laterally out of the fork crown in their active locking position.

Thus, the fork crown (9c) includes a socket (10a, 10b) at its lateral ends, in which a locking pin (11a, 11b), whose end constitutes the locking projection (6a, 6b), is mounted to move translationally. Each of the sockets having a horizontal axis (X2, X'2) comprises an axial cylindrical inner housing (12a, 12b) in which the locking pin (11a, 11b) is slidably mounted.

It is noted that each of the sockets (10a, 10b) includes an inner tubular portion (10') that is housed in the fork crown (9c) and an outer tubular portion (10") projecting out of the fork crown. In the first embodiment, it is via this outer tubular portion (10"), through cooperation with a ramp system, that the cycle is guided to its storage position, as explained in more detail in the description.

Each of the locking pins (11a, 11b) includes an inner cylindrical housing (13a, 13b) and a bottom wall (14a, 14b), a control rod (15a, 15b), one end of which is housed in the locking pin and the other end of which projects out of the locking pin, being arranged in said inner housing. It is noted that the end that is housed in the locking pin has a cylindrical guiding wall (16a, 16b) and a support surface (17a, 17b) for a compression spring (18a, 18b) whose other end is in support on a bottom wall of the corresponding locking pin. It is noted that the lateral portion of the control rod (15a, 15b), constituted by the cylindrical guiding wall and the support surface (17a, 17b), is in support on an inner peripheral abutment (110). This abutment limits the outward lateral movement of the locking pin, but allows the inward movement of said pin, against the force exerted by the spring (18a, 18b).

It is noted that a control connecting rod (19a, 19b) is articulated via one of its ends about a vertical axis (190), at the end of the control rod that projects out of the locking pin, and via its other end about a vertical axis (191), in the area of a rotatable control element (20). It is noted that said rotatable control element (20) is made in the form of a horizontal disk pivoting about the vertical axis (Y, Y') of the fork stem (9d) and including a central tubular portion (20a) extending upward. Moreover, the upper surface of the disk of the rotatable element includes a vertical rod (30) whose function will be specified later in the description.

In the active locking position whereby the locking projection projects, position illustrated in FIGS. 7b, 7d, 10, 12, 16b, 18 and 20, it is noted that the two connecting rods are aligned along the transverse axis (X2, X'2), thereby making the locked position secured by knuckle-joint effect, so that an axial force on the locking projections cannot cause a rotation toward the unlocked position. To switch from the active position to the inactive position, illustrated by 8, 8a, 16a, it suffices to pivot the rotatable control element (20) along (R); and inversely, to switch from the inactive position to the active position, it suffices to pivot the rotatable control element (20) along a reverse rotation.

The rotation of the rotatable control element is carried out due to the pivoting of a control rod (21), which extends vertically in the vertical axis (Y, Y') of the fork stem. The rotational control occurs at the top of the fork stem due to a key (23) identified and issued by the management terminal (4), which cooperates with a lock (22) arranged at the top of the head tube, in the case of bike management by key distribution.

It is understood from the foregoing that each of the movable lateral projections (6a, 6b) is kinematically connected to the rotatable control element (20) due to a connecting rod (19a, 19b) pivotally mounted on said rotatable element.

Two phases are provided to facilitate the engagement and positioning of the projections (6a, 6b) opposite the corresponding recesses (7a, 7b); a first phase, known as the positioning phase, which involves positioning the cycle in a precise equilibrium position, and a second locking phase whereby it only remains to bring the projections (6a, 6b) out of their locking recess (7a, 7b), this second step requiring almost no energy because the projection has a minimum clearance that is well controlled in all directions due to the positioning accuracy of phase 1. Thus, in this locking position, the projections do not take up any shear stress generated by the weight of the cycle, because it is taken up between the outer socket (10") and the recessed profile of the cam (8C).

Thus, to facilitate the insertion and positioning of the bicycle in its post, a first embodiment (FIG. 1 to 16) provides, for each of the recesses, an insertion and guiding recess (80) including a set of guiding ramps (8). Thus, the guiding recess is open toward the rear (AR), i.e., on the side of insertion of the cycle, and includes, for each of the arms:
- a lateral wall (8a) that is inclined to form, with the corresponding lateral wall the other arm, two walls diverging toward the rear;
- a curved lower ramp (8b) which, through cooperation with each of the locking projections, forces the front wheel to lift;
- a recessed profile (8c) which follows the lower ramp (8b) and thus positions each of the projections opposite the corresponding locking recess. This recessed profile serves to support the outer tubular portions (10") of each of the sockets (10a, 10b) to form the lateral supports (A, B) for retaining the cycle.

The set of guiding ramps guide the movement of the fork crown through cooperation of the ramps with the outer tubular portion (10") projecting out of the fork crown. Thus, after the user has engaged the front wheel of the cycle in the space (E) between the two arms (3a, 3b), they only need to move the cycle forward, and the locking is carried out without any difficulty.

Advantageously, the height (H1) of the axis (X1, X'1) of the recesses is greater than the distance (H2) between the axis (X2, X'2) of the projections and the point of contact between the ground and the front tire. Thus, in the storage position on its storage point, the front wheel is slightly raised above the ground, the cycle then being retained in lateral support (A, B) in the area of the lateral sockets. This enables the cycle to have a stable and balanced position in the storage position due to its supports at three points (A, B, C), namely the front lateral support (A, B) and rear support (C) on the rear wheel (50). It is understood that due to this arrangement of supports of the cycle on its storage point, its retention at three points, including two lateral points located above the center of gravity of the cycle, provides the latter with very good stability.

It is also noted that the cycle includes an antitheft system (24) that is used outside of the locking point, when the cycle is not locked on a storage point. The antitheft system (24) is constituted by a cable (25), for example a metallic cable, advantageously sheathed and housed in one of the frame tubes (26), one end of which is blocked on the frame after extraction, and whose other end, which is the free end, includes a rigid metallic pin (27) adapted to be engaged in a transverse locking hole made in the steering column of the frame, on the one hand, and in the fork stem in order to be locked therein by a latch (28), on the other hand, as will be seen later in the description.

It is noted that the antitheft system used outside of the station includes means for locking the steering in an angular position relative to the general plane (P) of the frame.

The pin (27) is comprised of a cylindrical rod portion, which includes a peripheral locking groove (27a) adapted to cooperate with a latch (28) that is rotationally mounted around the tubular portion (20a) of the rotatable control element. It is also noted that the end (27b) of the pin is substantially spherical to cause the rotation of the latch (28) when the pin is being inserted.

Inside the fork crown (9c) in the central position and above the rotatable control element (20) is arranged the latch (28), pivotally mounted on the axis of the rotatable control element that extends upward. This latch (28) is rotationally biased by a spring (29) so as to abut against an abutment (30) affixed to the rotatable control element (20), said abutment being comprised of the vertical rod (30) described previously.

Thus, the movable latch (28) is comprised of a tubular central portion (28a), whereas its lower end bears a lower flange (28b) that includes a projection (28c) adapted to be supported on the abutment (30) of the rotatable control element (20). The upper end of the tubular central portion includes an upper flange (28d) extended upward by a vertical locking wall (28e). The latter is adapted to block the metallic pin (27) of the antitheft lock.

It is noted that the head tube (33) of the frame includes, in the area of the vertical wall of the latch, a radial hole (31) having a horizontal axis and forming an acute angle (A) with the plane (P), whereas the wall of the fork stem (9d) includes, in the same horizontal plane, a corresponding hole (32) whose axis is not in alignment with the hole (31) of the head tube when the front wheel is aligned with the plane (P). Thus, when the front wheel is aligned with the plane (P), the hole (32) of the fork stem (9d) is not aligned with the hole (31) of the head tube (33) of the frame. It is understood that the two holes (31, 32) are adapted to receive the pin (27) of the antitheft lock cable.

Locking the cycle outside of the locking point is carried out in a first step via extraction of the cable out of the frame by grabbing the pin and by pulling the cable out of the frame until abutment; then the user orients the handlebar so as to align the two holes (31, 32) and, after engaging the pin (27) in the two aligned holes, the end ramp (27b) of the pin causes the latch (28) to pivot against the force exerted by the spring (29), until the vertical locking wall (28e) of the latch (28) can engage in the peripheral locking groove (27a) of the pin (27). Unlocking the antitheft lock is carried out by pivoting the key (22) engaged in the lock (23). Moreover, when the cycle is secured outside of the storage station, a malicious user attempting to borrow the cycle of an authorized user, by cutting the cable of the antitheft lock, would not be able to use the cycle, since the steering is locked in an angular position, which does not allow riding the cycle.

It is understood that the retrieval of a bicycle requires a key, and this key is distributed by a device for retrieving and returning the keys. This device is comprised of a key distribution panel (40) affixed to the distribution terminal (4). For this purpose, the terminal includes a key cabinet, and a communication panel that enables the user to communicate with a server. Said panel includes at least one set of instructions for use, a keypad and a display enabling the user to interact with the server and a card reader.

Figure 16:
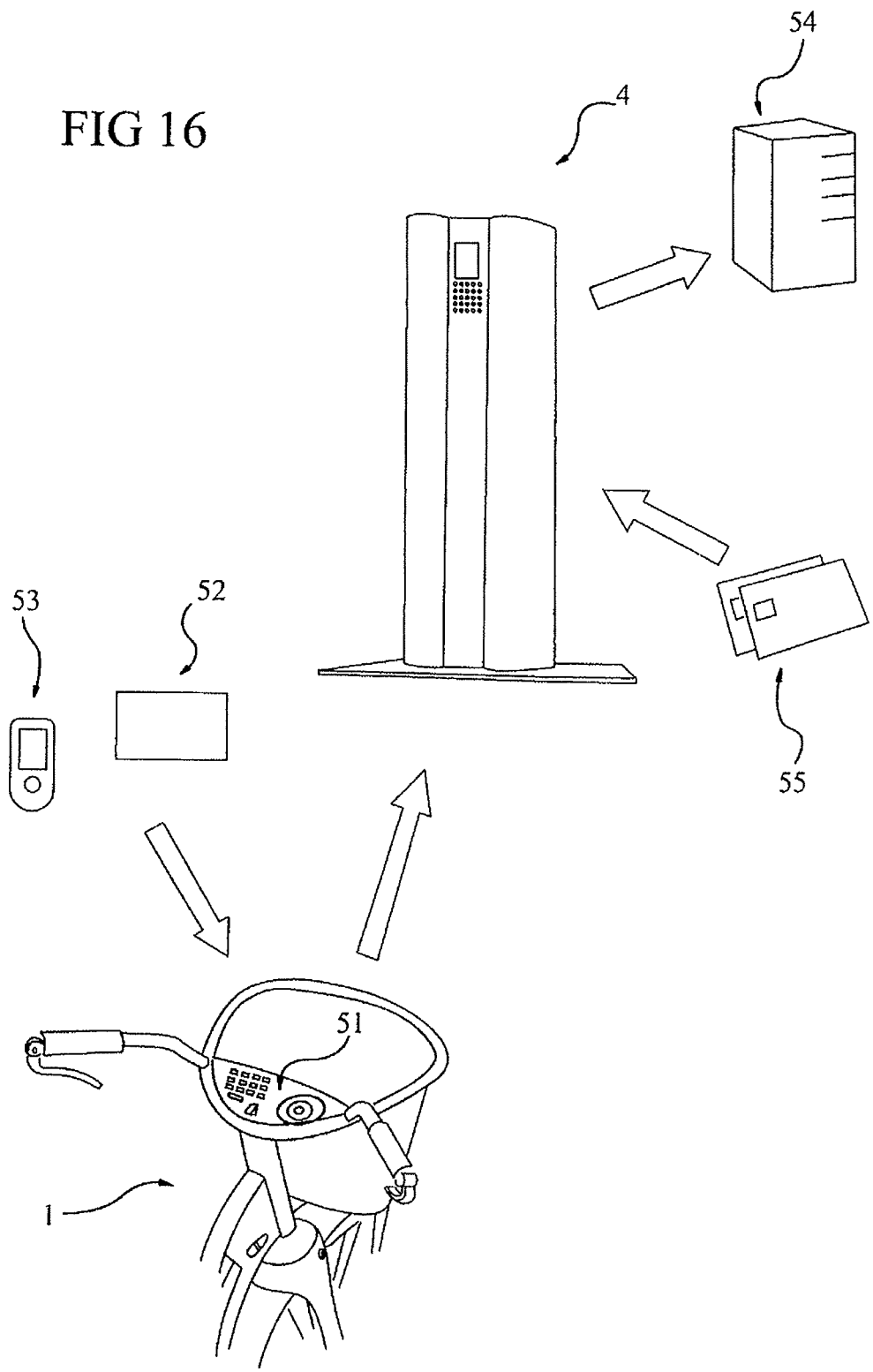
Figure 16A:
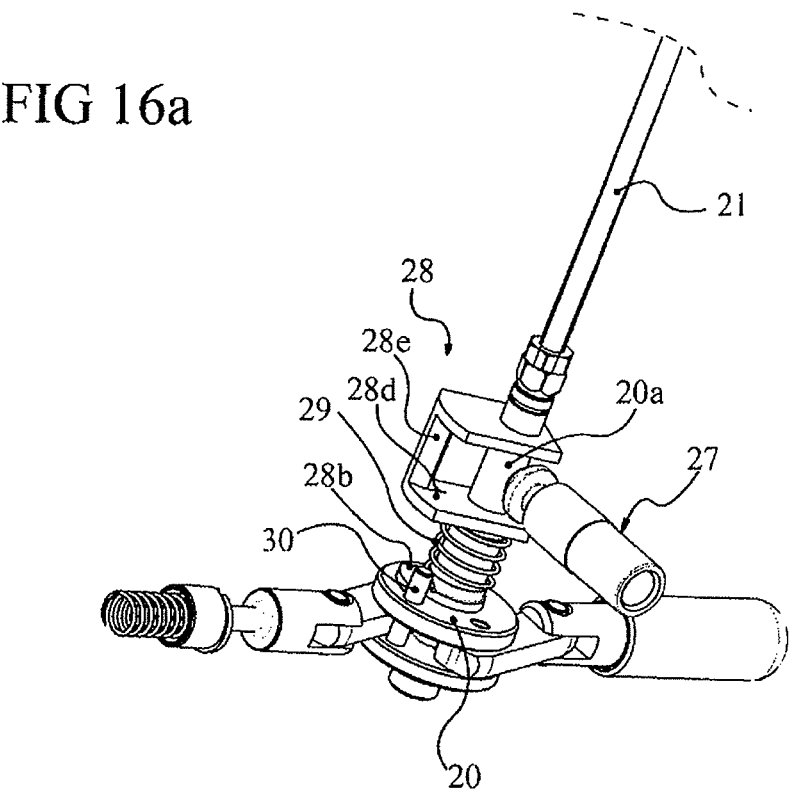
Figure 16B:
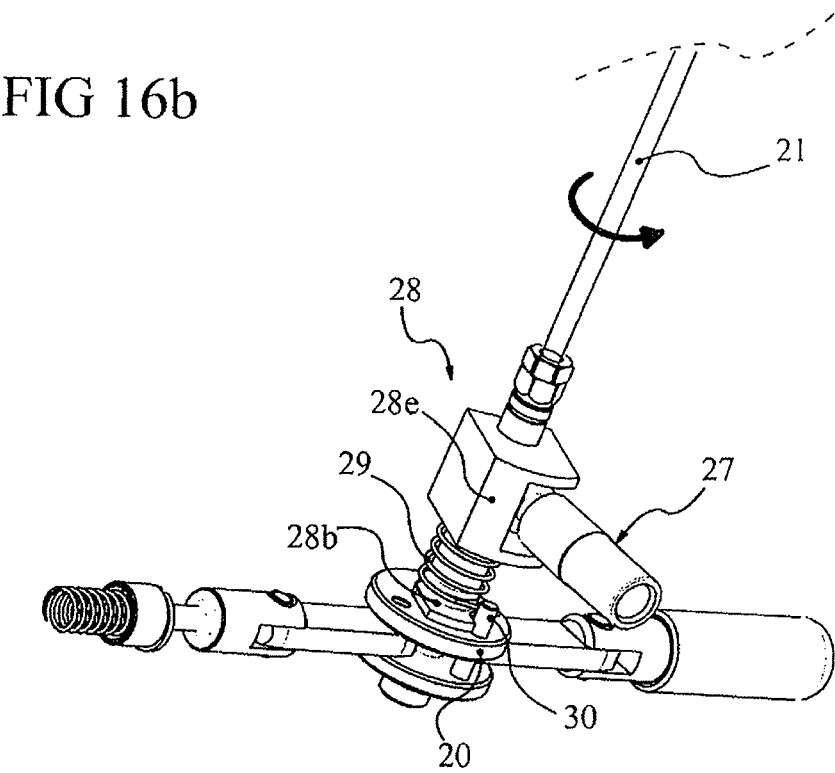

A system for distributing and returning bicycles, via key distribution, has been described hereinabove; although one could alternatively use radio frequency identification, commonly known by the acronym RFID, for example, which is a method for storing and retrieving data remotely using markers known as "radio tags", commonly called "RFID tags". These tags include an antenna and an electronic chip that can receive and respond to requests issued from the transceiver. Thus, in this case, the locking points are equipped with "tags", and the bicycle comprises a transponder. The "tag", which is a passive device, requires no power source. It is the bike that communicates with a terminal located in the vicinity of the storage point and communicates with a remote server, or directly with a remote server without going through a communication terminal. For this purpose, the bicycle can include a communication panel (51) powered by cells, batteries, a dynamo or the like, said panel (51) comprising a keypad and/or a card reader, for example. Thus, access to the service can be made directly using a subscription card (52) or a telephone (53), or by communicating with the management terminal (4) which communicates with a remote server (54) via WI-FI or GPRS connections, the payment being made by bank card (55), as illustrated in FIG. 16. In the case of a keyless electronic management, unlocking the bicycle from its storage point is carried out through a micro motor, for example, which would pivot the control rod (21).

Figure 19:
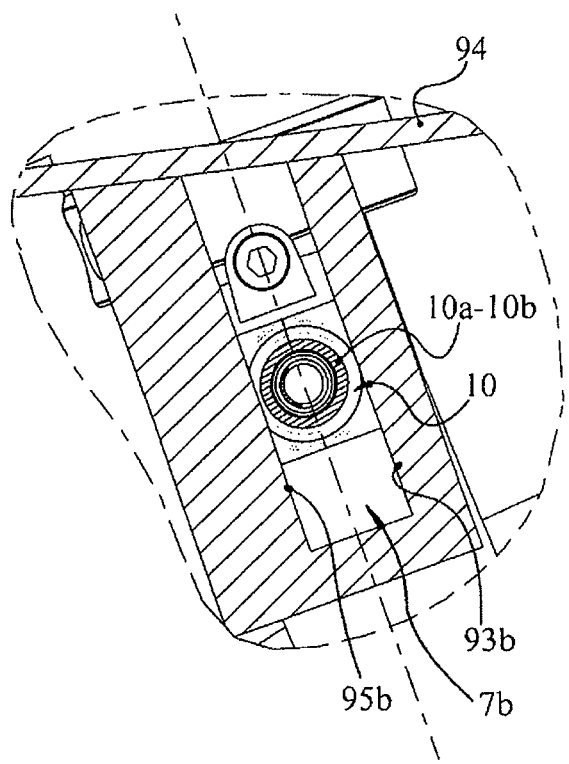
FIG. 19 is a partial cross-sectional view, along the line ZZ of FIG. 18, showing the longitudinal abutment means of the cycle toward the front, provided by the outer tabular portions of the sockets of the fork being supported against their longitudinal abutment on the locking point.
Figure 20:
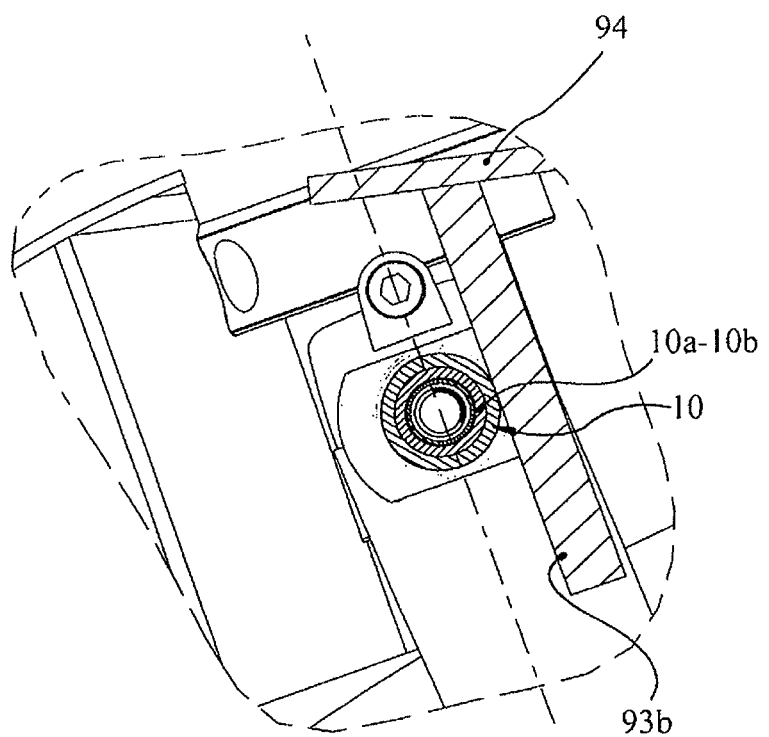
FIG. 20 is a partial cross-sectional view, along the line AA of FIG. 18, more particularly showing the locking means with the movable projections in their locking recess.
Figure 21:
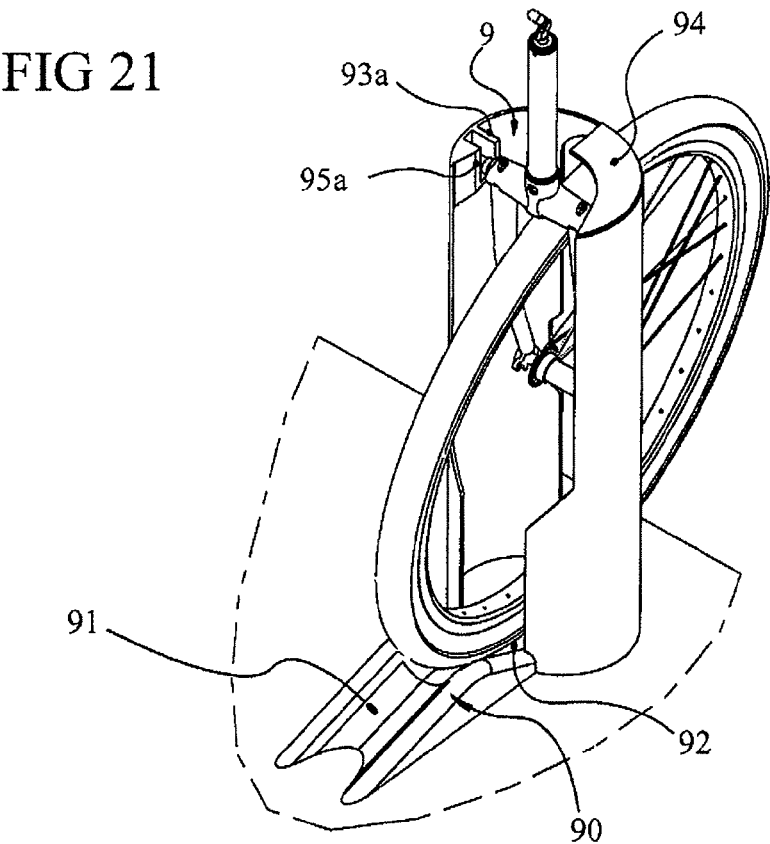
FIG. 21 is a ¾ rear perspective view of FIG. 18, in which the bicycle has been simplified to only show the fork and the front wheel, and in which the cover of the post has been removed on the left half in order to reveal the security mechanism.

In a second embodiment (FIGS. 18, 19, 20), the fork mechanism is identical to the first embodiment described hereinabove; however, the security terminal is a bit different.

The system for positioning the cycle for the first phase, referred to as the positioning phase, is this time not carried out through co-operation of the outer sockets (10) with the two cams, as in the first embodiment, but directly between the front wheel and a ramp (290) arranged on the ground. Thus, a user wishing to return the borrowed cycle positions the front wheel in front of the ramp (290), which ideally has a first convergent zone adapted to facilitate the centering of the tire on this ramp. The user then pushes the bike, forcing the front wheel to climb a first upward slope (91) of the ramp (290) so as to reach a position of maximum altitude, before descending naturally by gravity due to the second downward slope (92) of the ramp (290). The cycle then reaches the end of its travel due to the combined action of both right and left sockets (10a, 10b) of the fork (9) against the longitudinal abutments (93a, 93b) that are frontally arranged on the storage post, thus wedging the steering. Thus, the cycle is now very stably positioned on four support points, the point A in the area of the contact between the ground and the rear wheel, the points B and C in the area of the right and left guiding sockets, and the point D in the area of the contact between the downward slope (92) and the front wheel (5), the lateral centering of the cycle being provided by the centering of the tire in the ramp (290) near the ground, on the one hand, and by the right and left lateral surfaces of the fork in the zone of the sockets (10a, 10b), on the other hand.

The downward slope can form an angle of 5 to 25° with respect to the horizontal; the more substantial this angle, the more effective the stability on its support, thus making the cycle more stable during retrieval.

Once the first positioning phase is completed, it then suffices to lock the projections in their locking recess by turning the key or by initiating the rotation of the control motor. In this locking phase, the two locking pins (6a, 6b) come out to get locked in their locking recess (7a, 7b). It is no longer possible to remove the cycle because the projections then abut against the walls of the locking recess that is constituted vertically by the cover (94) and rearward by the abutments (95a, 95b).

This second embodiment has the advantage of inducing less friction, as it acts via the direct rolling of the front wheel in the ramp and no longer via friction on a cam. It also has the advantage of being very dimensionally tolerant and of operating in the same manner, with various types of tires or with a telescopic damping fork. In this case, it is preferable to incline the longitudinal abutments (93a, 93b) substantially parallel to the direction of the telescopic fork, so that the positioning is independent of the travel of the telescopic fork.

It is understood that irrespective of the mode of operation, the storage points are passive and free of any electrical connection and power supply, and of any sophisticated equipment, which is a great advantage over existing facilities, which require major civil engineering work. Thus, the operator can install storage points as he sees fit, and can add more storage points when necessary, without having to perform any connection work, since the storage points of the invention are passive, and their implementation only involves fixing them to the ground. In fact, the system of the invention enables the operator to fix the storage points using any type of configuration, including linear, circular, triangular, angular, etc., configurations.

When in the storage position on its storage point, the cycle is in a particularly stable position due to its lateral support on the arms of the storage point, with the front wheel not being supported on the ground.

Figure 22:
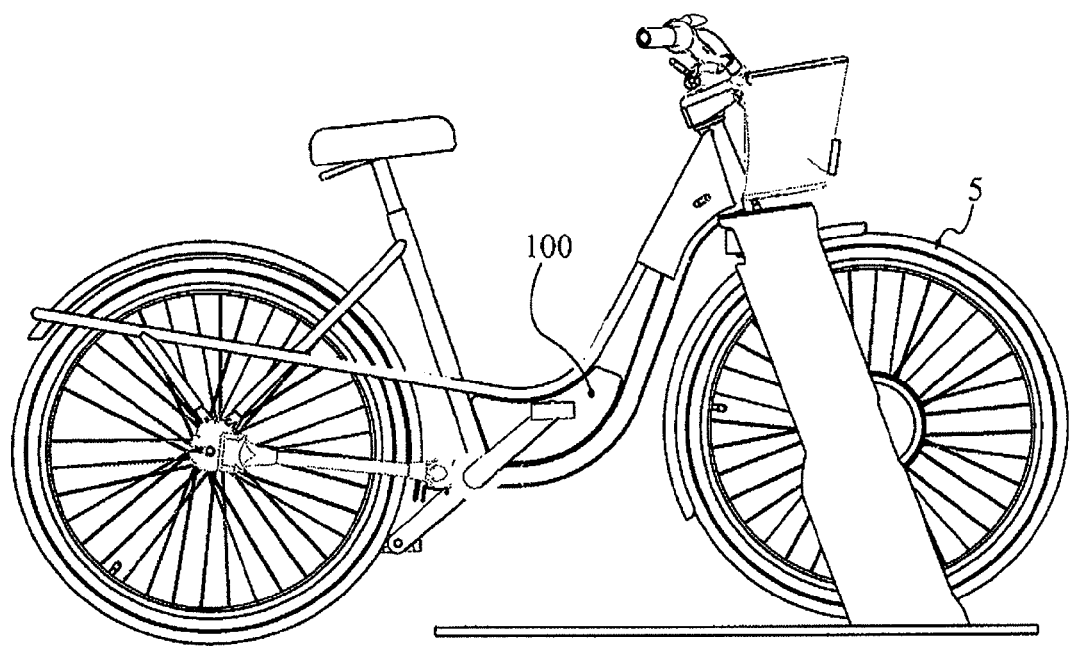
FIG. 22 is a side view of an electrically power-assisted cycle on its locking post, while the battery is being recharged.
Figure 23:
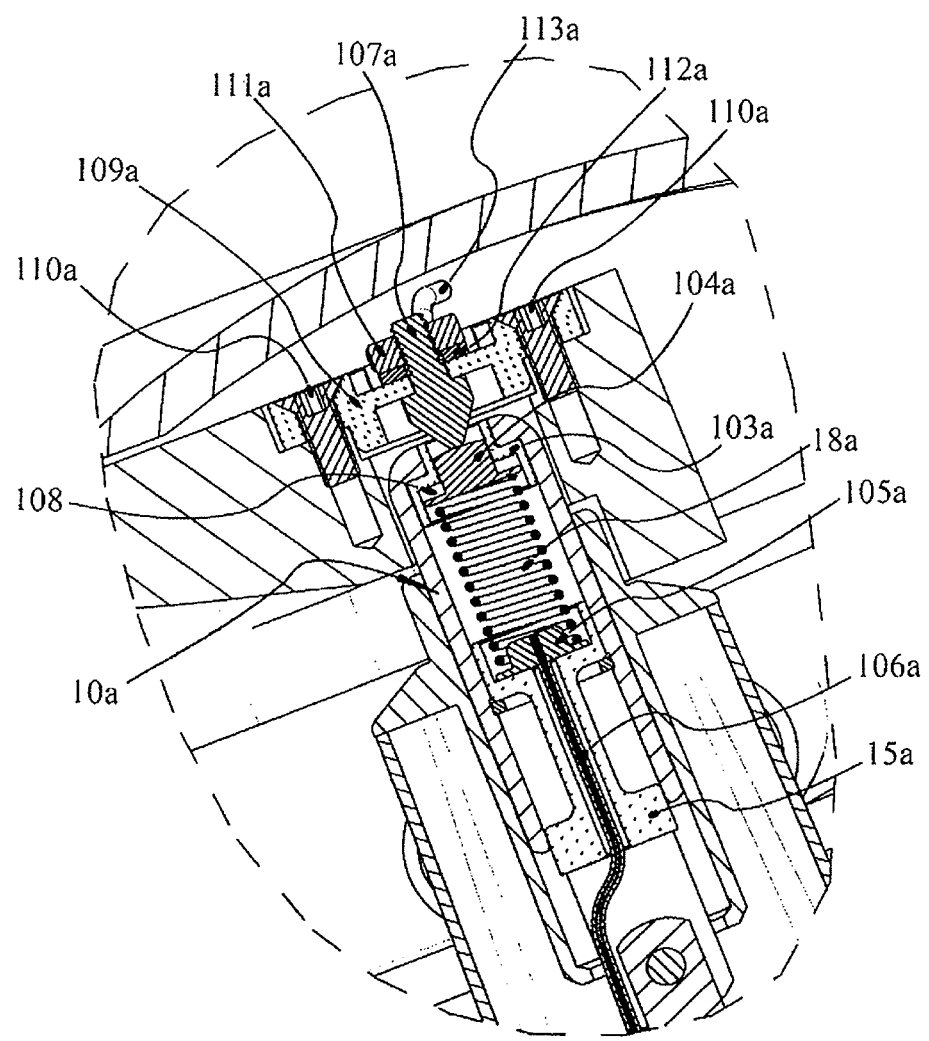
FIG. 23 is a partial cross-sectional view of FIG. 21, showing in detail the left connecting system for supplying the electric power needed to recharge the battery.

The electrically power-assisted cycle shown in FIGS. 22, 23 and 24 is a variation of the invention according to the first embodiment, comprising an electric accumulator (100) and an electric integrated motor assist, for example, in the front wheel (5), various sensors (torque, pedaling rate, speed, etc.), not shown, associated with a microcontroller used to control the power supply of the motor assist so that it provides assistance tailored to the needs of the cyclist. This type of cycle has an assist autonomy that is dependent upon on the required power, the battery capacity and the battery charge level; the autonomy nowadays generally ranges between 20 and 100 km, which is sufficient for urban rental usage, especially as a collective system always requires exchanging one cycle for another, charged, at an intermediate station. In this embodiment, the post is no longer passive, but must be powered (102) in order to recharge the battery of the cycle. However, the post can be made autonomous by providing it with photovoltaic solar panels.

The left connecting system shown in FIG. 23 is symmetrical on the right side, thus making it possible to shut-off an electric circuit for recharging the battery. This circuit can be powered by DC or AC; in this case, however, the management of the charge must be integrated into the cycle, with at least one rectifier system. As shown in FIG. 23, the locking pin (11a) is bored and comprises a fixed insulating ring (103a) for electrically insulating the movable central connection post (104a), made of a conductive metallic material with a coating having good electrical properties against corrosion (nickel, silver, gold, etc.). This connection stud is axially movable and pushed by the conductive compression spring (18a), itself in support internally on a connection stud (105a), in which is crimped or welded the left electric wire (106a) which is connected at its other end to the electronic control unit of the cycle. The control rod (15a) must be made in this case of an insulating material, for example acetal resin, in order not to short-circuit the electrical circuit. When the bicycle is unlocked, the spring (18a) pushes the connection stud (103a) to abut against the bottom wall of the locking pin (10a). Conversely, when the cycle is locked on its storage point, a fixed connection stud (107a) arranged on the station, opposite the movable central connection stud (104a) of the cycle, blocks it in its travel by generating a force that is equal to the preload of the spring (18a). This is the reason why, in this locked position, there is a functional clearance (108) between the axial support surface of the connection stud and the bottom wall of the locking pin. This clearance must be greater than the lateral clearance that the cycle has laterally in its storage station in order to always provide sufficient pressure to ensure the contact of both right and left sides and to avoid breaking-off the electrical circuit. As shown in FIG. 22, the fixed connection stud (107a) is electrically insulated from the structure of the station by an insulating ring (109a), itself embedded in the structure of the station by two screws (110a). The fixed connection stud (107a) is threaded so that it can be tightened in the insulating ring (109a) using a nut (111a) that concurrently tightens the lug (112a) connected electrically to the wire (113) supplying power to the unit. Thus, it is readily understood that the feed line (113a) of the station is then connected electrically to the inner feed line of the cycle, thus enabling the automatic charging of the battery via both left and right sides.

On this type of system with an electrical connection, it is very advantageous to add a unidirectional or bidirectional communication system, via the method known as PLC (Power Line Carrier) which involves transferring data by superimposing a modulated high frequency AC over the main current, and demodulating it upon receipt in order to retrieve the data. This technology is well described, for example, in the Patent Application FR 2 863 121; this system thus makes it possible to transmit any useful information regarding the identity of the cycle, the possible deficiencies thereof, the identity of the borrower, the distance traveled, the duration of the rental, the battery charge level, without the need of a radio frequency transmission, which is more expensive, consumes more energy, and is electro-magnetically more polluting and less reliable.

To prevent vandalism by shorting the fixed connection studs of the station, a protective flap can be added on each side to prevent the intrusion of objects. it is also desirable to add an electric and electronic protection to remove the main risks of vandalism and/or to use a method similar to that in the Application FR 2 590 087 to manage the charge of the accumulator.

There could be a plurality of connection studs on each side, or one could even use the direct contact of each of the sockets and of the locking pins with respect to the storage support, while electrically insulating them from one another.

It is noted that the storage station can also be equipped with an inflating device enabling users to inflate the cycle, if necessary.

The invention claimed is:

1. A cycle storage and locking system for locking plural cycles in at least one storage station, the system comprising:
    plural locking and storage points each structured and arranged to lock one of the cycles at the at least one storage station;
    each of the plural locking and storage points comprising two arms and a space arranged therebetween sized and configured to receive therein a front wheel of one of the cycles;
    a locking arrangement structured and arranged to lock one of the cycles to one of the plural locking and storage points; and
    the locking arrangement comprising two laterally movable lateral locking projections arranged on the one of the cycles and two locking recesses arranged on the one of the plural locking and storage points.

2. The cycle storage and locking system of claim 1, wherein each cycle is capable of being locked, while in a vertical orientation, in the at least one storage station and each cycle comprises a front steering system that includes a front fork having two fork blades connected by a fork crown and a fork stem.

3. The cycle storage and locking system of claim 2, wherein the two laterally movable locking projections are arranged on the fork crown.

4. The cycle storage and locking system of claim 2, wherein one of:
    the two laterally movable locking projections are each arranged on one of the two fork blades; and
    the two arms are fixed to the ground and extend upward.

5. The cycle storage and locking system of claim 1, wherein an upper portion of an inner wall of each of the two arms includes one of the two locking recesses and each of the two locking recesses comprises a shape that is complementary to a shape of the two laterally movable locking projections.

6. The cycle storage and locking system of claim 1, wherein the locking arrangement further comprises:
    a rotatable control element; and
    a control rod arranged inside a fork stem of the one of the cycles.

7. The cycle storage and locking system of claim 1, wherein the locking arrangement further comprises:
    a rotatable control element arranged inside the fork crown; and
    a control rod arranged inside a fork stem of the one of the cycles.

8. The cycle storage and locking system of claim 1, wherein one of:
    the locking arrangement is capable of being unlocked via a keyless electronic management system; and
    the locking arrangement is capable of being unlocked via a micro motor that rotates a control rod.

9. The cycle storage and locking system of claim 1, wherein the two laterally movable lateral locking projections are each kinematically connected to a rotatable control element via a pivotally mounted connecting rod.

10. The cycle storage and locking system of claim 1, wherein the two laterally movable lateral locking projections are each slidably disposed within a socket.

11. The cycle storage and locking system of claim 10, wherein each said socket comprises an inner tubular portion arranged within a fork crown of the one of the cycles and an outer tubular portion projecting out of the fork crown, and wherein the outer tubular portion is sized and configured to engage with a ramp system so as to guide the one of the cycles into a storage and locking position.

12. The cycle storage and locking system of claim 1, wherein the two laterally movable lateral locking projections each comprise:
    a locking pin:
    an inner cylindrical housing;
    a control rod arranged within the inner cylindrical housing and having a cylindrical guiding wall;
    a compression spring; and
    an inner peripheral abutment.

13. The cycle storage and locking system of claim 1, wherein each the two laterally movable lateral locking projections is coupled to a rotatable control element that rotates about a vertical axis via a control connecting rod.

14. The cycle storage and locking system of claim 1, wherein, in the locked position, each of the two laterally movable lateral locking projections engage one of the two locking recesses and two connecting rods are aligned along a transverse axis, whereby the locked position is secured by knuckle joint action such that an axial force on each locking projection does not cause a rotation of a rotatable control element toward an unlocked position.

15. The cycle storage and locking system of claim 1, wherein each of the two laterally movable lateral locking projections comprises:
    a locking pin;
    a movable central connection stud adapted to cooperate with a fixed connection stud in a locked position;
    each fixed connection stud being connectable to a power supply; and
    each movable central connection stud being electrically connectable to an electrical circuit of the one of the cycles.

16. The cycle storage and locking system of claim 1, further comprising an antitheft system comprising a steering lock device for locking a steering of the one of the cycles in an angular position relative to a general plane of a cycle frame.

17. The cycle storage and locking system of claim 16, wherein the antitheft system is usable outside of the at least one storage station and comprises:
    a cable; and
    at least one of:
        a pin arranged on one end of the cable and being adapted to engage a transverse locking hole arranged on a steering column of the one of the cycles; and
        a latch arranged in a fork stem of the one of the cycles.

18. A cycle storage and locking system for locking plural cycles in at least one storage station, the system comprising:
    plural upright locking and storage devices each structured and arranged to lock one of the cycles at the at least one storage station;
    each of the plural locking and storage devices comprising two arms, a space arranged therebetween sized and configured to receive therein a front wheel of one of the cycles, and two locking recesses;
    two laterally movable lateral locking projections arranged on each of the plural cycles; and
    at least one of:
        a spring arranged within each the two laterally movable lateral locking projections; and
        an outer projecting portion of each of the two laterally movable lateral locking projections being structured and arranged to slidably engage with a respective guide recess arranged on one of the two arms,
    wherein, in a locked position, each cycle has its front wheel located within the space and each of the two locking recesses receives therein one of the two laterally movable lateral locking projections.

19. The cycle storage and locking system of claim 18, wherein each the two laterally movable lateral locking projections is coupled, via a pivotally mounted control rod, to a rotatable control element that rotates about a vertical axis.

20. A cycle storage and locking system for locking plural cycles in at least one storage station, the system comprising:
    plural upright locking and storage devices each structured and arranged to lock one of the cycles at the at least one storage station;
    each of the plural locking and storage devices comprising two arms, a space arranged therebetween sized and configured to receive therein a front wheel of one of the cycles, and a locking recess arranged on each of the two arms; and
    a steering fork of each of the plural cycles comprising a rotatable control element and two laterally movable lateral locking projections connected to the rotatable control element,
    wherein, in a locked position, each cycle has its front wheel located within the space, the rotatable control element is in a locked rotatable position, and each locking recess receives therein one of the two laterally movable lateral locking projections, and
    wherein, in a unlocked position, the rotatable control element is in an unlocked rotatable position and the two laterally movable lateral locking projections do not extend into the locking recesses.

* * * * *